(12) United States Patent
Folmar

(10) Patent No.: US 12,550,883 B2
(45) Date of Patent: Feb. 17, 2026

(54) GAME CALL HAVING OFFSET SKIRT

(71) Applicant: Jonathan Russel Folmar, Cedarburg, WI (US)

(72) Inventor: Jonathan Russel Folmar, Cedarburg, WI (US)

( * ) Notice: Subject to any disclaimer, the term of this patent is extended or adjusted under 35 U.S.C. 154(b) by 202 days.

(21) Appl. No.: 18/645,567

(22) Filed: Apr. 25, 2024

(65) Prior Publication Data
US 2025/0331511 A1 Oct. 30, 2025

(51) Int. Cl.
*A01M 31/00* (2006.01)

(52) U.S. Cl.
CPC .................. *A01M 31/004* (2013.01)

(58) Field of Classification Search
CPC .................................. A01M 31/004
USPC .................. 446/176, 213, 208, 207, 202
See application file for complete search history.

(56) References Cited

U.S. PATENT DOCUMENTS

| | | |
|---|---|---|
| 1,367,176 A | 2/1921 | Bridges |
| 3,738,056 A | 6/1973 | Schultz |
| 4,218,845 A | 8/1980 | Allen |
| 4,341,037 A | 7/1982 | Moss |
| 4,483,097 A | 11/1984 | Piper |
| 4,614,503 A | 9/1986 | Skoda |
| 4,897,067 A | 1/1990 | Piper |
| 4,927,399 A | 5/1990 | Mueller |
| 4,960,400 A | 10/1990 | Cooper |
| 5,234,369 A | 8/1993 | Forbes |
| 5,415,578 A | 5/1995 | Jacobsen |
| 5,785,574 A | 7/1998 | Sears |
| 6,953,378 B1 | 10/2005 | Finley, Jr. |
| 8,016,638 B1 | 9/2011 | Kirby |
| 10,172,344 B1 * | 1/2019 | Carlton ............... A01M 31/004 |
| 10,448,629 B2 | 10/2019 | Koch |
| 2004/0209543 A1 | 10/2004 | Davis |
| 2010/0279581 A1 | 11/2010 | Borhofen |
| 2017/0188568 A1 | 7/2017 | Vaicunas |
| 2021/0076665 A1 * | 3/2021 | Jordan .................... G10K 9/00 |
| 2021/0345598 A1 * | 11/2021 | Folmar ............... A01M 31/004 |

* cited by examiner

*Primary Examiner* — Joshua D Huson
(74) *Attorney, Agent, or Firm* — Andrus Intellectual Property Law, LLP

(57) ABSTRACT

A game call includes a holder molded from an elastomeric material that is configured to retain to a resting shape. A body portion of the holder includes a slot formed in an inward-facing surface of the body that extends around a cutout positioned at a front side of the body. The slot formed in the body portion is designed to receive and retain a reed insert that includes a diaphragm configured to extend across the cutout when the reed insert is received in the holder. The holder is designed such that a centerline of an outer skirt is located below a centerline of the body portion such that more than 50% of the thickness of the body portion is above the centerline of the skirt. The offset of the skirt modifies the airflow over the diaphragm.

17 Claims, 6 Drawing Sheets

GAME CALL HAVING OFFSET SKIRT

BACKGROUND

The present disclosure generally relates to a game call, and in particular a game call intended to be held in a user's mouth. Many different types of game calls are used to produce sounds to attract game animals. One type of game call comprises a flexible diaphragm stretched across an open-ended frame. The call is placed against the roof of the user's mouth and then various techniques may be used to produce appropriate sounds by forcing air across the diaphragm.

In many past game call designs, a diaphragm is stretched across a metal frame to form a reed insert. The reed insert is then sandwiched between two layers of tape. In such game call, the metal frame and diaphragm are equally spaced between the top and bottom layers of tape. Since tape is used on the top and bottom of the frame, the only possible orientation for the reed insert is in the middle of the tape formed housing.

US Patent Application Publication No. 2021/0345598 is directed to a game call that replaces the two layers of tape with a holder that is formed from an elastomeric material that is designed to receive and retain a reed insert. In the design shown, the holder includes a body portion and an integrally formed outer skirt that is joined to the body portion at the midpoint of the body portion such that the same thickness of the body portion is located above and below the centerline of the skirt.

The inventor has recognized that by including an offset of skirt relative to centerline of the body portion between the top and bottom surfaces of the body portion, different amounts of turbulence can be created as compared to a centered design. The different offsets allow the game call to be designed to create different sounds as compared to a centered design.

SUMMARY

The present disclosure relates to a game call with a flexible holder configured to hold a sound-generating reed insert. The holder can be formed from materials that are safe for inclusion in a user's mouth, and which are sufficiently durable so that the game call can be used repeatedly without the holder being damaged.

The holder of an exemplary embodiment of the present disclosure is formed as a one-piece member that is designed to receive and retain a reed insert that includes a diaphragm supported by an outer frame. The holder includes a main body portion that is molded from elastomeric material and is safe for use in the mouth of a user. The body portion has a thickness that is defined between a top surface formed on a top wall and a bottom surface on a bottom wall. A U-shaped cutout is formed at the center of the main body portion and is defined by an inward-facing surface.

The inward-facing surface that defines the cutout includes an open slot that is designed to receive and retain the reed insert. The slot is defined by the top and bottom walls that are each equally spaced from a centerline of the body portion. The centerline extends through the middle of the thickness of the body portion such that an equal percentage of the thickness of the body portion is located both above and below the centerline of the body portion.

The one-piece holder further includes a skirt that is joined to and extends from the body portion. The skirt extends in a direction away from the cutout formed by the body portion. In accordance with the present disclosure, the skirt is joined to the body portion at a position such that the centerline of the skirt is offset from the centerline of the body portion. In an exemplary embodiment, the centerline of the skirt is offset below the centerline of the body portion such that the skirt is located further from the roof of the mouth of the user as compared to the centerline of the body portion.

In one embodiment, the skirt is joined to the body portion such that the centerline of the skirt is located below the centerline of the body portion. In such a configuration, more than 51% of the thickness of the body portion is located above the centerline of the skirt and no more than 49% of the thickness is located below the centerline of the skirt. In some embodiments, as much as 90% of the thickness of the body portion is located above the centerline of the skirt. Various ratios of the amount of the thickness of the body portion located above and below the centerline of the skirt are contemplated.

In another contemplated embodiment, a game call is disclosed that includes a holder formed as a one-piece member that is designed to receive and retain a reed insert that includes a diaphragm supported by an outer frame. The holder includes a main body portion that is molded from the elastomeric material and is safe for use in the mouth of a user. The body portion has a thickness that is defined between a top surface formed on a top wall and a bottom surface on a bottom wall. A cutout is formed at the center of the body portion and is defined by an inward-facing surface.

The inward-facing surface includes an open slot that is designed to receive and retain the reed insert. The slot is defined by the top and bottom walls that are each equally spaced from a centerline of the body portion. The centerline of the body portion extends through the middle of the thickness of the body portion such that an equal percentage of the thickness is located above and below the centerline of the body portion.

The one-piece holder further includes a skirt that is joined to and extends from the body portion in a direction away from the cutout formed by the body portion. In accordance with the present disclosure, the skirt is joined to the body portion in a position such that the centerline of the skirt is offset from the centerline of the body portion. In an exemplary embodiment, the centerline of the skirt is offset below the centerline of the body portion such that the skirt is located further from the roof of the mouth of the user as compared to the centerline of the body portion.

In one embodiment, the centerline of the skirt is located such that more than 51% of the thickness of the body portion is located above the centerline and no more than 49% of the thickness is located below the centerline of the skirt. In some embodiments, as much as 90% of the thickness of the body portion is located above the centerline of the skirt.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, the term "U-shaped" specifies a shape that includes a base portion, with at least two leg portions extending in generally similar (e.g., parallel) directions from the base portion. In some embodiments, a "U-shaped" structure can include leg portions extending from opposite ends of the base portion at substantially right angles to the base portion, with or without curved or chamfered connecting regions between the leg portions and the base portion. In some embodiments, a "U-shaped" structure can include at least one of legs of different lengths and at least one curved portion.

Embodiments of the disclosure may be further understood in reference to the figures.

Figure 1:
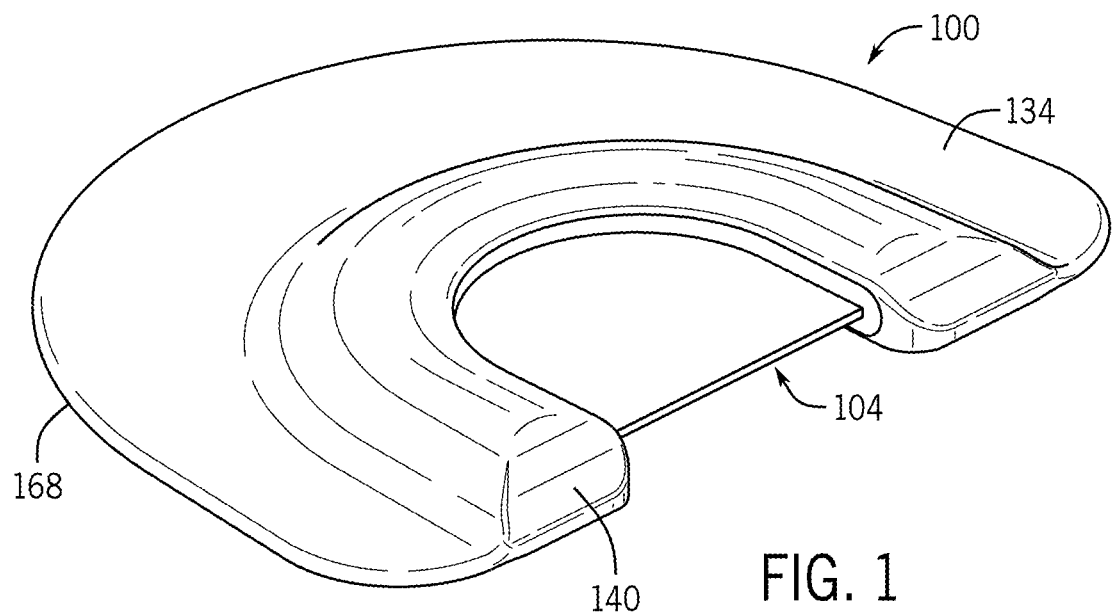
FIG. 1 is a perspective view of an embodiment of a game call including a flexible holder and a reed insert.
Figure 2:
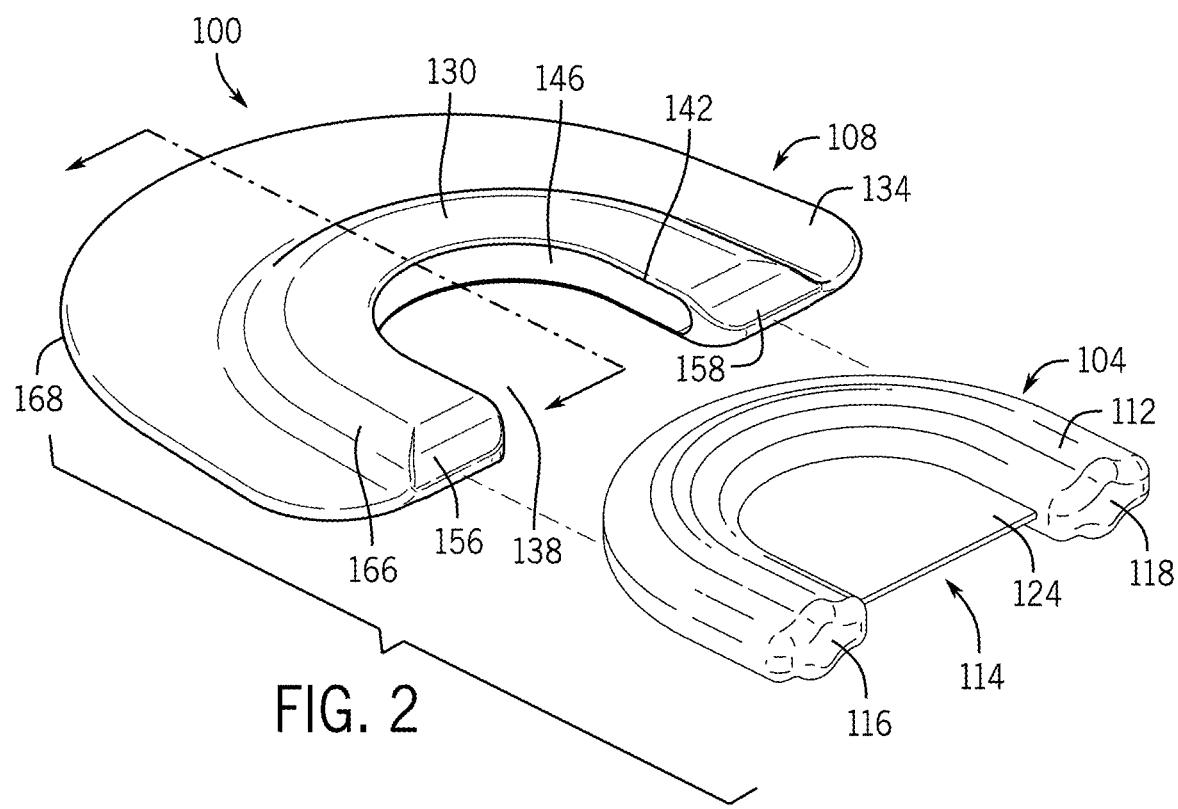
FIG. 2 is an exploded perspective view of the flexible holder and reed insert of FIG. 1.

FIGS. 1 and 2 illustrate an embodiment of a game call 100 with a reed insert 104 configured to be secured in a holder 108. The reed insert 104 includes a frame 112 that is generally U-shaped and has an open front side 114. The frame 112 extends rearward from a first end 116 and a second end 118, which are spaced laterally apart from each other at the front side 114 of the frame, towards the back end that is positioned between the first and second ends 116, 118. A diaphragm 124 can be stretched across the frame 112 so that the diaphragm 124 extends across a gap between opposite sides of the frame 112. In some embodiments, the diaphragm 124 may provide a planar sheet that spans (i.e., covers or fills in) the gap. In other embodiments, the diaphragm 124 can include multiple layers of flexible rubber material designed to create the desired sound to simulate the game being called.

In some embodiments, the frame 112 can include a pair of U-shaped planar halves, each being mateable with a corresponding plane of the other. The halves of the frame 112 can be secured to each other to sandwich a diaphragm 124 between the halves, thereby securing the diaphragm to the frame 112. The two halves of the frame 112 may be linked at their front ends so that the halves of the frame 112 are folded onto the diaphragm 124. Additionally, a tab positioned at the rear of one of the halves may be folded onto the other half of the frame 112, securing the two halves together. In other embodiments, however, a game call can include a reed insert that includes different components or is produced using a different method.

With continued reference to FIGS. 1 and 2, the holder 108 can include a reed receiving body portion 130, which may be configured to receive the reed insert 104, and a skirt 134 formed around a portion of the reed receiving body portion 130. The reed receiving body portion 130 and the skirt 134 can be formed from an elastomeric material that is configured to return to its original resting shape after being stretched or deformed. This may be useful, for example, to allow the holder 108 to retain its original shape after being stretched and manipulated by a user. In some embodiments, the holder 108 may be formed with a thermoset material, such as a plastisol or rubber elastomer. Other embodiments of a holder 108 may be formed with at least one of another thermoset elastomer, a thermoplastic, rubber, silicone, and any other material exhibiting elastic or resilient properties. It is contemplated that the material used to form the holder 108 will be selected such that the material is suitable for use in the oral cavity of the user. In a contemplated embodiment, the material used to form the holder will be formally approved for use in the oral cavity by the Food and Drug Administration (FDA).

In the illustrated embodiment, a cutout 138 positioned at the front side 140 of the body 130 extends backwards towards an inward-facing surface 142 of the body portion 130, providing an open end on the front side 140. The inward-facing surface 142 wraps around the cutout 138 between endpoints that are positioned at the front side 140 on opposite lateral sides of the cutout 138. To accommodate the reed insert 104, the holder 108 can include an open slot 146 formed into the inward-facing surface 142. As illustrated in the section view of FIG. 3A, the slot 146 extends into the body portion 130 from an opening on the inward-facing surface 142 towards a rear wall 150 of the slot 146. The top and bottom extents of the slot 146 are respectively bound by a top wall 152 and a bottom wall 154 formed on opposite vertical sides of the rear wall 150. As shown in FIGS. 1 and 2, the ends of the slot 146 are bound by a first front wall 156 and a second front wall 158, which are positioned on opposite lateral sides of the cutout 138.

As previously mentioned, the body portion 130 of the holder 108 can be configured to receive the reed insert 104. As illustrated in FIG. 2, for example, slot 146 extends around the cutout 138 in a U-shaped path with dimensions that correspond to the dimensions of the frame 112 of the reed insert 104. The body portion 130 can be dimensioned so that the diaphragm 124 extends out of slot 146 and provides a continuous sheet spanning across the cutout 138 while the reed insert 104 is in the holder 108. While the frame 112 is received in the slot 146, the first end 116 of the frame 112 is positioned behind the first front wall 156 of the body 130, and the second end 118 of the frame 112 is positioned behind the second front wall 158 of the body 130. Abutment between the ends 116, 118 of the frame and the first and second front walls 156, 158 may restrict sliding movement of the reed insert 104 relative to the holder 108. This may be useful, for example, in order to prevent the reed insert 104 from sliding out of the holder 108. Additionally or alternatively, the body 130 can be configured to grip the frame 112 to apply a retention force against the removal of the reed insert 104 from the holder 108.

In a contemplated exemplary embodiment, an adhesive is positioned between the frame 112 of the reed insert 104 and the inner surfaces of the elastomeric material that forms the open slot 136. The adhesive is selected to create the required bond between the metallic frame 112 and the elastomeric material of the holder 108. In yet another contemplated embodiment, the metallic frame 112 could be ultrasonically welded to the material of the holder 108. The bonding between the reed insert is designed to prevent separation of the component and to restrict the entry of moisture into the open slot 146 during use of the game call 100 in the mouth of the user.

Figure 7:
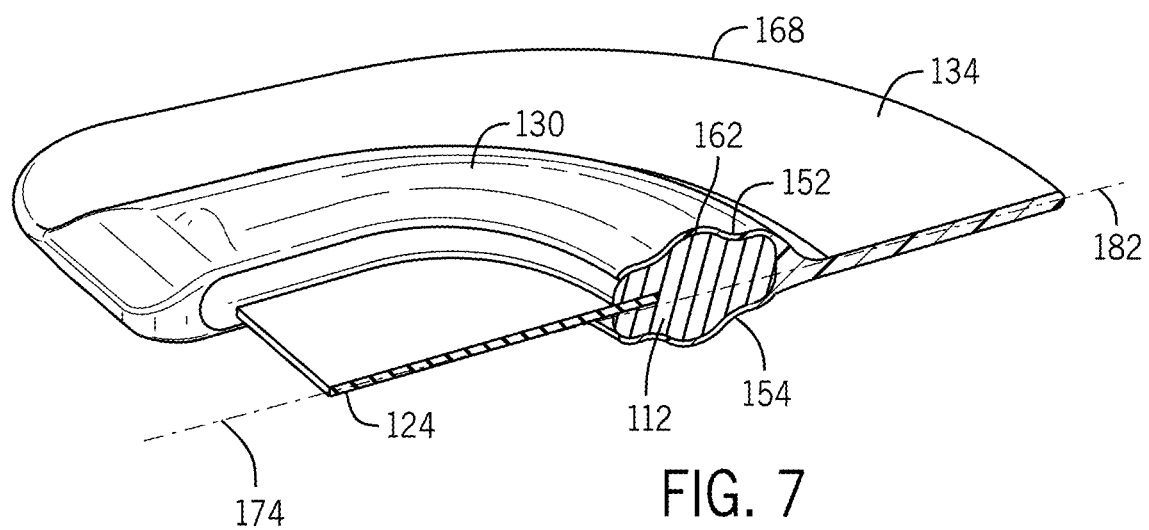
FIG. 7 is a perspective cross section view of the holder and reed insert of FIG. 6 taken along section line 7-7.

The open slot 146 can be dimensioned so that the at least one of top wall 152, the bottom wall 154, and the rear wall 150 snugly fit around the frame 112 to create friction between their surfaces. Some embodiments of the body portion 130 can be configured to conform to features on the surface of the frame 112. For example, as illustrated in FIG. 7, the top and bottom walls 152, 154 can conform to and grip ridges 162 protruding from the top and bottom of the frame 112. Some embodiments of a body portion 130 can be configured to conform to other features on a frame, including protrusions such as a tab, or recesses such as a groove or divot.

Referring back to FIGS. 1 and 2, the skirt 134 extends from an outward-facing surface 166 of the body portion 130 to a peripheral edge 168. In the illustrated embodiments, the outward-facing surface 166 extends around the body portion 130 in a U-shaped path the mirrors the inward-facing surface 142. As shown in the cross-section of FIG. 3, the skirt 134 is integrally formed with the body portion 130 and is formed from the same material as the body portion 130. The skirt 134 is designed to be flexible and may return to a resting shape after being manipulated by a user. This may be useful, for example, so that the skirt 134 can conform to the interior of a user's mouth during use of the game call.

When used, the game call 100 is placed in the mouth of a user and held above the tongue with the cutout 138 and the front walls 156, 158 of the body 130 facing outwardly towards the user's teeth. The "top" of the game call 100 is placed into contact with the upper palate and the "bottom" of the game call 100 is positioned to contact the tongue of the user. The skirt 134 can flex to contact the upper palate snugly, which may help to keep the game call 100 lodged in place during use. When the user blows, an airstream travels beneath and past the skirt 134, past the bottom surface of the body 130, then beneath and past the diaphragm 124, thereby generating an audible oscillation. Various techniques may be implemented by the user to produce a variety of different sounds with the game call 100.

Figure 3A:
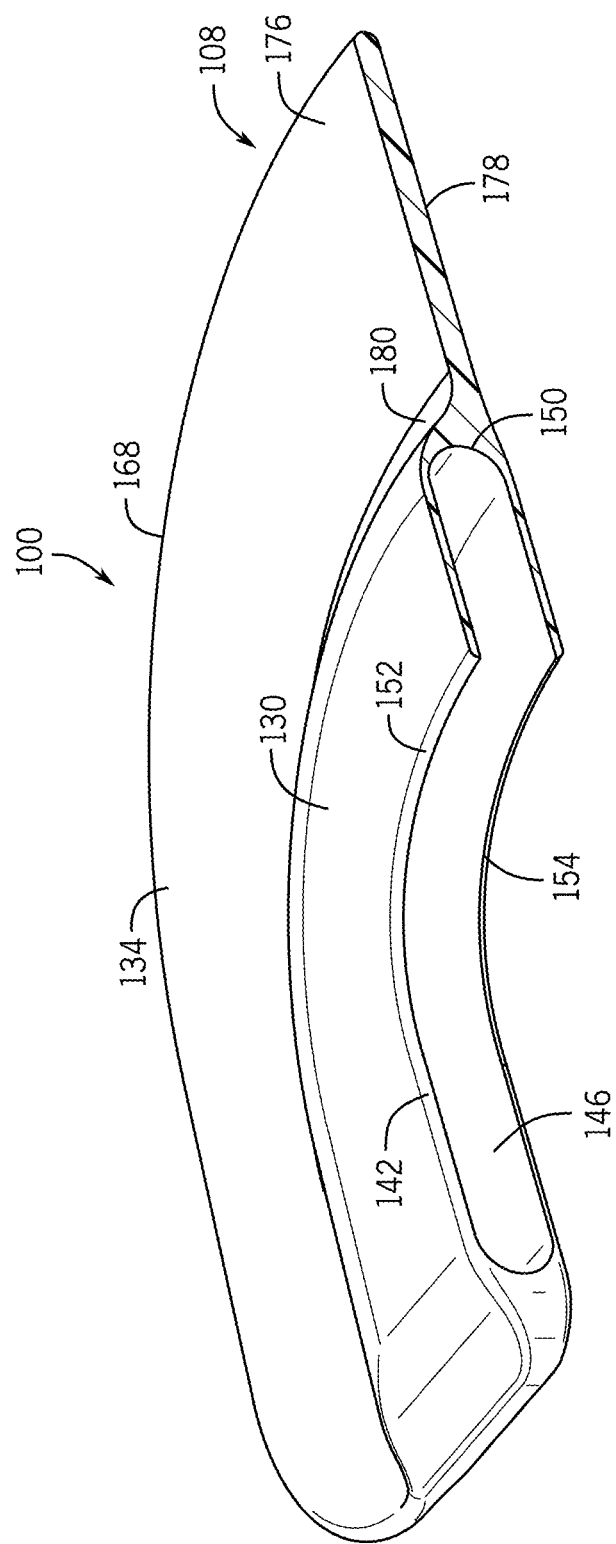
FIG. 3A is a perspective cross section of the game call of FIG. 1 taken along section line 3-3.
Figure 3B:
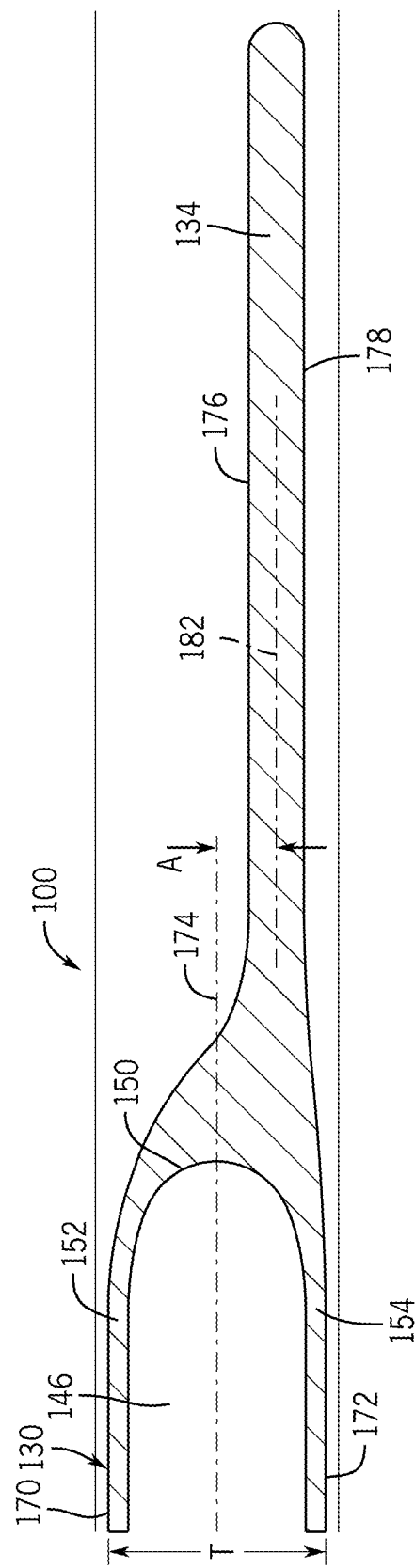
FIG. 3B is a magnified sectional view of the game call shown in FIG. 3A.

Referring now to FIGS. 3A and 3B, the preferred configuration of the game call 100 of the present disclosure will be further discussed. As discussed above, the holder 108 includes an open slot 146 formed in the body portion 130. The open slot 146 is defined between a top wall 152 and a bottom wall 154. The space in between the top wall 152 and the bottom wall 154 defines a thickness T of the body portion 130. The thickness T is defined by a top surface 170 on the top wall 152 and a bottom surface 172 on the bottom wall 154. As shown in FIG. 3B, the overall thickness T of the body portion 130 is equally spaced above and below a centerline 174. The centerline 174 extends through the general center of the open slot 146 such that an equal amount of the open slot 146 is located both above and below the centerline 174. As shown in FIG. 3B, the centerline 174 extends through the center of the curved rear wall 150 that defines the back surface of the open slot 146.

Referring back to FIG. 3A, skirt 134 extends from the peripheral edge 168 to a position where the skirt 134 joins the body portion 130. As illustrated in a sectional view of FIG. 3A, the skirt 134 is a generally planar element having a top surface 176 and a bottom surface 178. The bottom surface 178 is designed to face toward the tongue of a user, while the top surface 176 is positioned in contact with the upper palate of a user's mouth. The terms top surface and bottom surface are relative to the position of the game call 100 within a user's mouth as discussed above.

As shown in FIG. 3A, the body portion 130 joins to the skirt 134 through a transition portion 180. Since the entire holder 108 is formed from a single piece of molded material, the transition portion 180 creates a smooth transition between the thickness of the body portion 130 and the decreased thickness of the skirt 134.

Referring now to FIG. 3B, the skirt 134 has a thickness that extends generally along a centerline 182 that is equally spaced between the top surface 176 and the bottom surface 178 of the skirt. The centerline 182 of the skirt 134 is spaced a distance A from the centerline 174 that extends through the center of the body portion 130. In the embodiment shown, the centerline 182 is positioned below the centerline 174 of the body portion 130. As discussed previously, the thickness T of the body portion 130 is defined between the bottom surface 172 and the top surface 170.

Since the centerline 182 of the skirt 134 is positioned below the centerline 174, more than 50% of the thickness of the body portion 130 is positioned above the centerline 182. Specifically, the design of the present disclosure positions the skirt 134 such that more than 50% of the thickness of the body portion 130 will be located above the centerline 182. More specifically, it is contemplated that in some designs, 75% of the thickness T of the body portion 130 will be located above the centerline 182. In yet another embodiment, 90% of the thickness T of the body portion 130 will be located above the centerline 182. In each of the embodiments of the present disclosure, more than 51% of the thickness T of the body portion 130 will be located above the centerline 182 of the skirt 134 and thus less than 40% of the thickness T will be located below the centerline 182.

In currently available game calls that utilize two sections of tape on either side of the reed insert, the centerline of the skirt is generally aligned with the centerline of the body portion. This type of configuration is dictated by the construction of the game call using two sections of tape.

Figure 4:
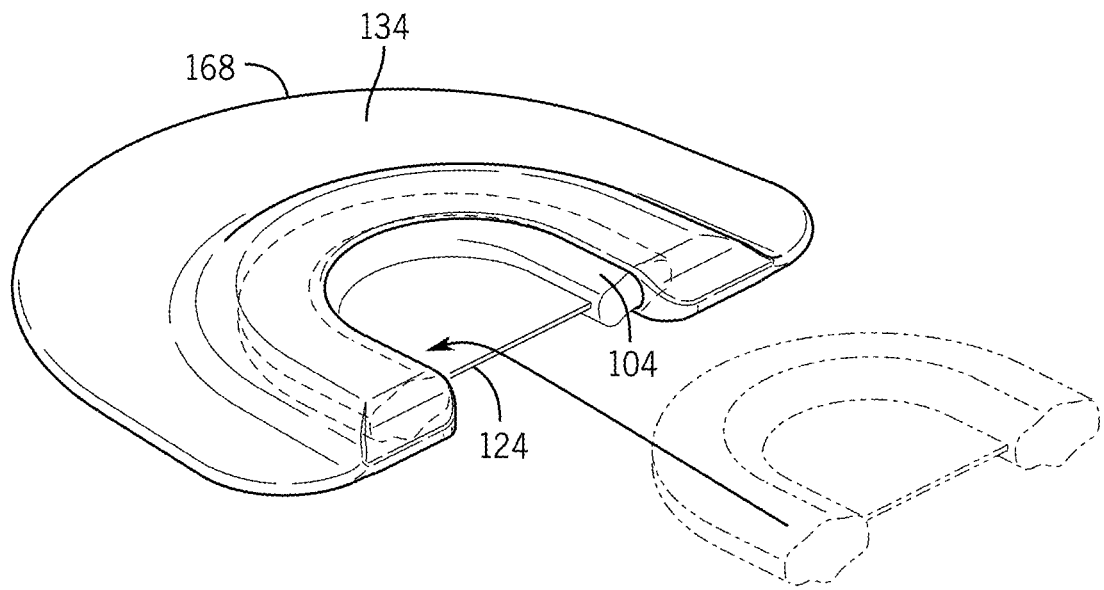
FIG. 4 perspective view illustrating a step for inserting a reed insert into the flexible holder.
Figure 5:
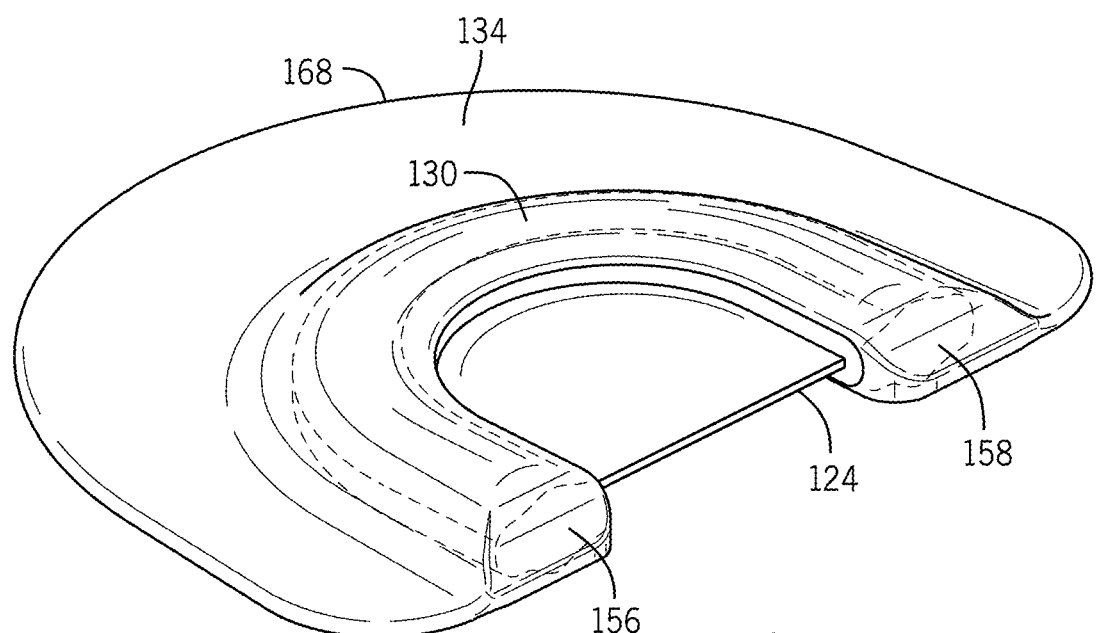
FIG. 5 is a perspective view of a game call with a reed insert received in a holder.
Figure 6:
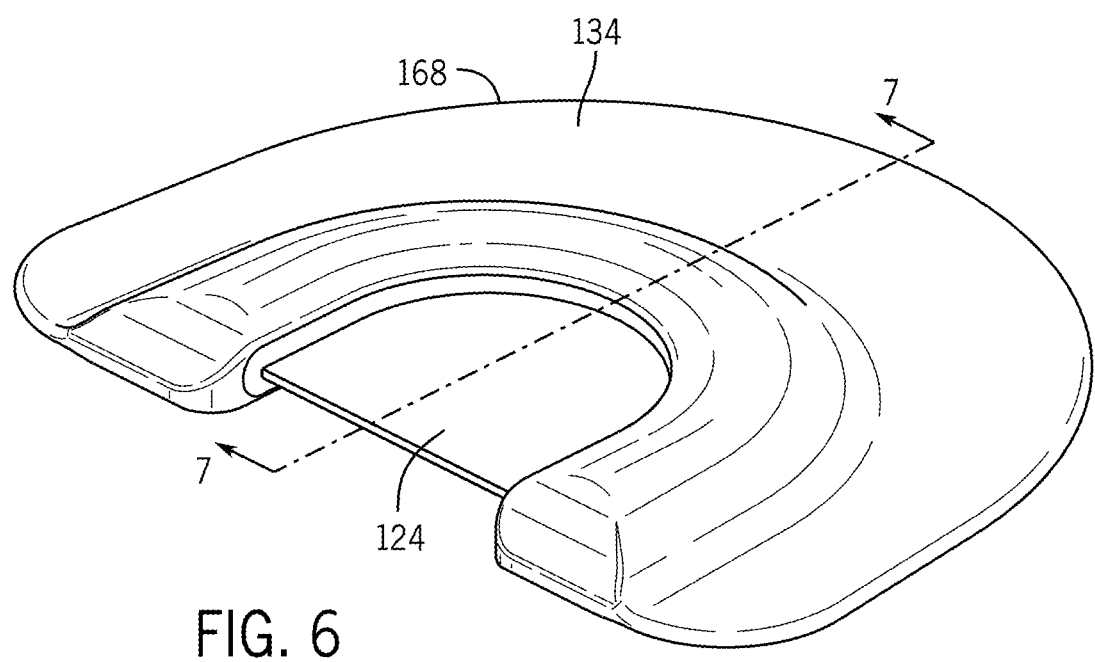
FIG. 6 is a perspective view of the flexible holder and reed insert.

Referring now to FIGS. 4 and 5, when the reed insert 104 is inserted into the open slot, the diaphragm 124 is generally aligned with the centerline of the body portion 130. Thus, the diaphragm 124 will be spaced above the centerline of the skirt 134. The spacing between the diaphragm 124 and the centerline of the skirt 134 allows the user to manipulate air over the diaphragm in a different way and manner as compared to an embodiment in which the centerline of the skirt 134 is aligned with the centerline of the body portion 130. Further, the location of the centerline can be modified during manufacturing to provide yet another variable that can be used to configure the specific game call 10.

Referring back again to FIG. 3B, the game call 100 of the present disclosure is designed such that a greater portion of the thickness T of the body portion 130 is located above the centerline 182 of the skirt 134. The ratio of the percentage of the thickness located above the centerline 182 as compared to below the centerline 182 can be changed depending upon the requirement for the specific game call. However, it is contemplated that more than 50% of the thickness T will be located above the centerline 182.

Figure 8:
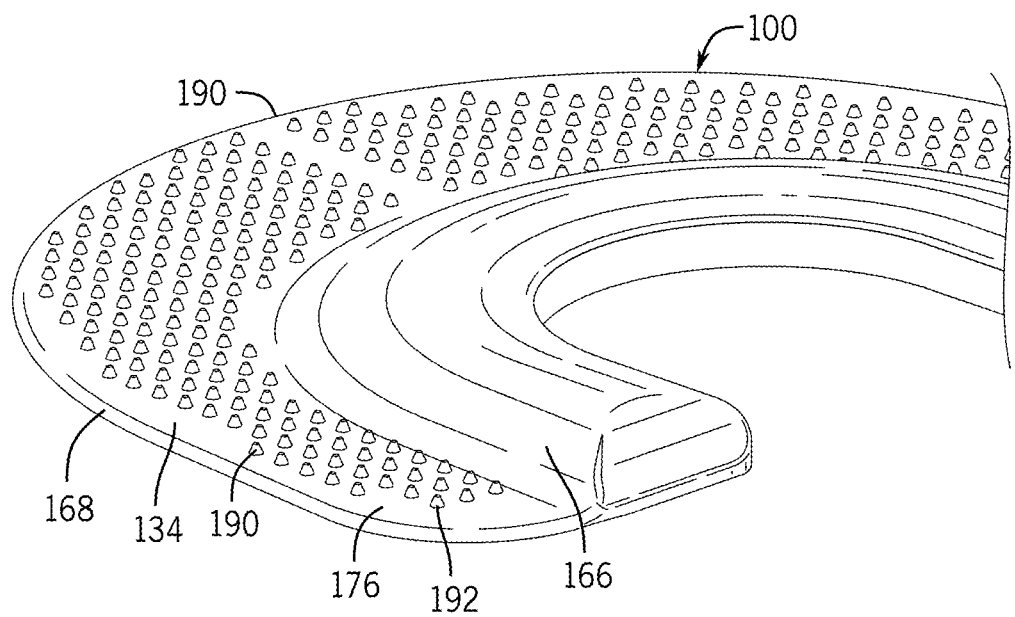
FIG. 8 is a perspective view of a first alternate embodiment including a first type of gripping elements on the flexible holder.

As indicated above, the game call 100 is designed to include a skirt 134 that engages the upper palette of a user during use of the game call 100. The user typically holds the game call 100 in place by creating a holding force by pressing the tongue against the bottom surface 178 and holding the game call 100 in place while creating an airflow over the bottom surface 178 and the diaphragm 124. FIG. 8 illustrates a first alternate embodiment of the game call 100 that includes a plurality of engagement members 190 that are spaced over the entire upper surface area of the skirt 134 from the outward facing surface 166 to the peripheral edge 168. The engagement members 190 are designed to create additional grip with the roof of the upper palette, which may be required upon a large volume of air being directed over the bottom surface, such as may be needed to increase the volume of the call or to create a desired call sound.

In the embodiment shown in FIG. 8, the plurality of engagement members 190 are pyramid-shaped cleats 192 that extend above the top surface 176 of the skirt 134. Each of the cleats 192 combine to create a roughened surface that enhances the gripping between the skirt and the roof of the user's mouth. The size of the cleats 192 are selected to provide a comfortable feel for the user while enhancing the grip with the roof of the mouth.

Figure 9:
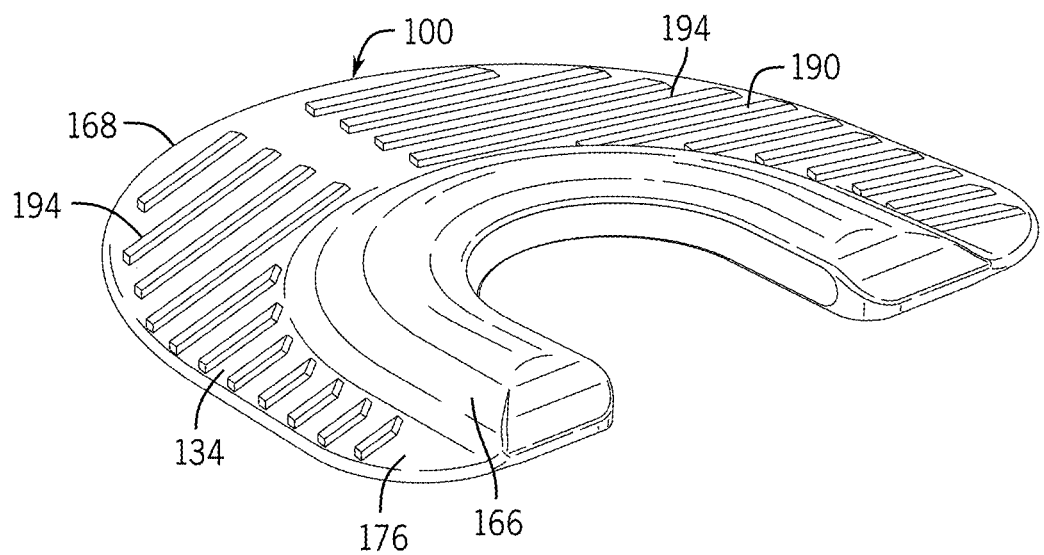
FIG. 9 is a perspective view of a second alternate embodiment include a second type of gripping elements on the flexible holder.

FIG. 9 illustrates a second alternate embodiment of the game call that includes a second type of engagement member 190 on the skirt 134. The second embodiment of the engagement members 190 functions in the same way as the first embodiment of FIG. 8 and increases the grip between the skirt 134 and the roof of the mouth. In the second embodiment of FIG. 9, the engagement members 190 are a series of rails 194 that extend above the top surface 176 of the skirt 134. The rails 194 are spaced from each other and are generally parallel to each other along the top surface 176. The spacing between the rails 194 can be selected to create the desired gripping while also providing a comfortable feel for the user during use of the game call 100. The rails 194 will be formed from the same material as the rest of the holder 108 during the molding process for the holder 108. The number and spacing of the rails 194 can be varied depending upon design requirements.

Although two alternate types of engagement members 190 are shown in the embodiments of FIGS. 8 and 9, it is contemplated that other alternate embodiments could be deigned and used. The engagement members 190 are included to increase the gripping between the game call 100 and the roof of the mouth to prevent movement during use. Any shape or texture could be used while operating withing the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A one-piece holder for a game call, the game call including reed insert with a diaphragm supported by a frame, the holder comprising:
   a body portion molded from an elastomeric material configured to retain to a resting shape, the body portion having a thickness and further including an inward-facing surface that extends around a cutout positioned at a front side of the body;
   a slot formed in the inward-facing surface, the slot being defined by a top wall and a bottom wall equally spaced from a centerline of the body portion and spaced from each other to define a thickness of the body portion, the slot being dimensioned to receive the frame of the reed insert so that the diaphragm spans across the cutout; and
   a skirt joined to the body portion and extending from the body portion in a direction away from the cutout, wherein a centerline of the skirt is offset from the centerline of the body portion towards the bottom wall.

2. The holder of claim 1 wherein the centerline of the body portion is located at a center of the thickness of the body portion and the centerline of the skirt is positioned such that at least 75% of the thickness is above the centerline of the skirt and at most 25% of the thickness is below the centerline of the skirt.

3. The holder of claim 1 wherein the centerline of the body portion is located at a center of the thickness of the body portion and the centerline of the skirt is positioned such that at least 51% of the thickness is above the centerline of the skirt and at most 49% of the thickness is below the centerline of the skirt.

4. The holder of claim 1 wherein the centerline of the body portion is located at a center of the thickness of the body portion and the centerline of the skirt is positioned such that at least 90% of the thickness is above the centerline of the skirt and at most 10% of the thickness is below the centerline of the skirt.

5. The holder of claim 1, wherein the elastomeric material is a plastisol or a rubber elastomer.

6. The holder of claim 5, wherein the elastomeric material is suitable for inclusion in an oral cavity of a user.

7. The holder of claim 1 further comprising a plurality of engagement members protruding from a top surface of the skirt.

8. A game call comprising:
   a holder with a body portion molded from an elastomeric material configured to retain to a resting shape, the body portion having a thickness and further including an inward-facing surface that extends around a cutout positioned at a front side of the body;
   a reed insert including a diaphragm stretched across a frame, the reed insert configured to extend across the cutout when the reed insert is received in the holder;
   a slot formed in the inward-facing surface of the body portion, the slot being defined by a top wall and a bottom wall equally spaced from a centerline of the body portion and spaced from each other to define a thickness of the body portion, the slot being dimensioned to receive the frame of the reed insert so that the diaphragm spans across the cutout; and
   a skirt joined to the body portion and extending from the body portion in a direction away from the cutout, wherein a centerline of the skirt is offset from the centerline of the body portion towards the bottom wall.

9. The game call of claim 8 wherein the centerline of the body portion is located at a center of the thickness of the body portion and the centerline of the skirt is positioned such that at least 75% of the thickness is above the centerline of the skirt and at most 25% of the thickness is below the centerline of the skirt.

10. The game call of claim 8 wherein the centerline of the body portion is located at a center of the thickness of the body portion and the centerline of the skirt is positioned such that at least 51% of the thickness is above the centerline of the skirt and at most 49% of the thickness is below the centerline of the skirt.

11. The game call of claim 8 wherein the centerline of the body portion is located at a center of the thickness of the body portion and the centerline of the skirt is positioned such that at least 90% of the thickness is above the centerline of the skirt and at most 10% of the thickness is below the centerline of the skirt.

12. The game call of claim 8, wherein the elastomeric material is a plastisol or a rubber elastomer.

13. The game call of claim 12, wherein the elastomeric material is suitable for inclusion in an oral cavity of a user.

14. The holder of claim 8 further comprising a plurality of engagement members protruding from a top surface of the skirt.

15. A one-piece holder for a game call, the game call including reed insert with a diaphragm supported by a frame, the holder comprising:
　　a body portion molded from an elastomeric material configured to retain to a resting shape, the body portion including an inward-facing surface that extends around a cutout positioned at a front side of the body;
　　a slot formed in the inward-facing surface the slot being defined by a top wall and a bottom wall equally spaced from a centerline of the body portion and spaced from each other to define a thickness of the body portion, the slot being dimensioned to receive the frame of the reed insert so that the diaphragm spans across the cutout; and
　　a skirt joined to the body portion and extending from the body portion in a direction away from the cutout, wherein a centerline of the skirt is offset from the centerline of the body portion toward the bottom wall, the skirt including a top surface and a plurality of engagement members protruding from the top surface.

16. The holder of claim 15 wherein the plurality of engagement members are spaced over the entire top surface of the skirt.

17. The holder of claim 15 wherein the plurality of engagement members are configured to increase engagement with a mouth of a user during use of the holder.

* * * * *